(12) United States Patent
Sharma et al.

(10) Patent No.: US 9,413,827 B2
(45) Date of Patent: Aug. 9, 2016

(54) CONTEXT AWARE ACTIONS AMONG HETEROGENEOUS INTERNET OF THINGS (IOT) DEVICES

(71) Applicant: QUALCOMM Incorporated, San Diego, CA (US)

(72) Inventors: Sandeep Sharma, San Diego, CA (US); Mohammed Ataur Rahman Shuman, San Diego, CA (US); Amit Goel, San Diego, CA (US); Ashutosh Aggarwal, San Diego, CA (US); Binita Gupta, San Diego, CA (US); Sarah Glickfield, Jerusalem (IL); Isaac David Guedalia, Bet Shemesh (IL)

(73) Assignee: QUALCOMM INCORPORATED, San Diego, CA (US)

( * ) Notice: Subject to any disclaimer, the term of this patent is extended or adjusted under 35 U.S.C. 154(b) by 205 days.

(21) Appl. No.: 14/187,156

(22) Filed: Feb. 21, 2014

(65) Prior Publication Data

US 2014/0244710 A1 Aug. 28, 2014

Related U.S. Application Data

(60) Provisional application No. 61/769,050, filed on Feb. 25, 2013, provisional application No. 61/930,775, filed on Jan. 23, 2014.

(51) Int. Cl.
*G06F 15/16* (2006.01)
*H04L 29/08* (2006.01)
(Continued)

(52) U.S. Cl.
CPC .............. *H04L 67/12* (2013.01); *H04L 67/303* (2013.01); *H04L 67/327* (2013.01); *H04W 4/005* (2013.01);
(Continued)

(58) Field of Classification Search
CPC ...... H04L 67/12; H04L 67/303; H04L 67/327
See application file for complete search history.

(56) References Cited

U.S. PATENT DOCUMENTS 8,671,099 B2 * 3/2014 Kapoor ............. G06F 17/30707
707/737
9,131,266 B2 * 9/2015 Guedalia .......... H04N 21/43615
(Continued)

FOREIGN PATENT DOCUMENTS

CN 102811416 A 12/2012

OTHER PUBLICATIONS

Guo B., et al., "From the Internet of things to embedded intelligence," 2012, pp. 1-29.
(Continued)

*Primary Examiner* — Moustafa M Meky
(74) *Attorney, Agent, or Firm* — Muncy, Geissler, Olds & Lowe, P.C.

(57) ABSTRACT

An aspect enables context aware actions among heterogeneous Internet of Things (IoT) devices. An IoT device receives data representing a context of each of a first set of IoT devices, receives data representing a current state of each of a second set of IoT devices, and determines an action to perform at a target IoT based on the received data. An aspect verifies an implied relationship between a first user and a second user by detecting an interaction between a first user device belonging to the first user and a second user device belonging to the second user, storing information related to the interaction in a first interaction table associated with the first user device, assigning a relationship identifier to the second user based, at least in part, on the information related to the interaction, and determining whether or not the assigned relationship identifier is correct.

26 Claims, 13 Drawing Sheets

(51) Int. Cl.
    *H04W 4/00*     (2009.01)
    *H04W 4/08*     (2009.01)
    *H04W 4/20*     (2009.01)
    *H04W 4/02*     (2009.01)

(52) U.S. Cl.
    CPC ............... *H04W 4/08* (2013.01); *H04W 4/206* (2013.01); *H04W 4/008* (2013.01); *H04W 4/023* (2013.01); *H04W 4/028* (2013.01)

(56) References Cited

U.S. PATENT DOCUMENTS

| | | |
|---|---|---|
| 2008/0109867 A1 | 5/2008 | Panabaker et al. |
| 2010/0228767 A1 | 9/2010 | Slinker et al. |
| 2011/0173246 A1 | 7/2011 | Eschenauer et al. |
| 2012/0065749 A1 | 3/2012 | Hunter |
| 2012/0198015 A1 | 8/2012 | Gorti et al. |
| 2015/0201022 A1* | 7/2015 | Kim ................ H04W 4/005 709/203 |

OTHER PUBLICATIONS

International Search Report and Written Opinion—PCT/US2014/018390—ISA/EPO—Oct. 30, 2014.

Bandyopadhyay S., et al., "Role of Middleware for Internet of Things: A Study," International Journal of Computer Science & Engineering Survey (IJCESES), Aug. 2011, vol. 2 (3), pp. 94-105.

Pantsar-Syvaniemi S., et al., "Context-Awareness in Smart Spaces," IEEE Symposium on Computers and Communications (ISCC), Jun. 2010, pp. 1023-1028.

Perera C., et al., "CA4IOT: Context Awareness for Internet of Things," Research School of Computer Science, The Australian National University, CSIRO ICT Center, 2013, 8 pages.

Preuveneers D., et al., "Internet of Things: A Context-Awareness Perspective," Chapter 13, Dec. 3, 2007, pp. 287-308.

Taiwan Search Report—TW103106315—TIPO—Sep. 8, 2015.

* cited by examiner

CONTEXT AWARE ACTIONS AMONG HETEROGENEOUS INTERNET OF THINGS (IOT) DEVICES

CROSS-REFERENCE TO RELATED APPLICATIONS

The present application for patent claims the benefit of U.S. Provisional Application No. 61/769,050, entitled "CONTEXT AWARE ACTIONS AMONG HETEROGENEOUS INTERNET OF THINGS (IOT) DEVICES," filed Feb. 25, 2013, and U.S. Provisional Application No. 61/930,775, entitled "METHOD AND APPARATUS FOR WEIGHTING CO-INCIDENCE OCCURRENCE," filed Jan. 23, 2014, assigned to the assignee hereof, and expressly incorporated herein by reference in their entirety.

BACKGROUND OF THE INVENTION

1. Field of the Disclosure

The disclosure is related to enabling context aware actions among heterogeneous Internet of Things (IoT) devices.

2. Description of the Related Art

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

An aspect of the disclosure is related to enabling context aware actions among heterogeneous Internet of Things (IoT) devices. A method for enabling context aware actions among heterogeneous IoT devices includes receiving, at an IoT device, data representing a context of each of a first set of IoT devices in an IoT network, receiving, at the IoT device, data representing a current state of each of a second set of IoT devices in the IoT network, and determining, by the IoT device, an action to perform at a target IoT based on the received data representing the context of each of the first set of IoT devices and the received data representing the current state of each of the second set of IoT devices.

An apparatus for enabling context aware actions among heterogeneous IoT devices includes logic configured to receive, at an IoT device, data representing a context of each of a first set of IoT devices in an IoT network, logic configured to receive, at the IoT device, data representing a current state of each of a second set of IoT devices in the IoT network, and logic configured to determine, by the IoT device, an action to perform at a target IoT based on the received data representing the context of each of the first set of IoT devices and the received data representing the current state of each of the second set of IoT devices.

An apparatus for enabling context aware actions among heterogeneous IoT devices includes means for receiving, at an IoT device, data representing a context of each of a first set of IoT devices in an IoT network, means for receiving, at the IoT device, data representing a current state of each of a second set of IoT devices in the IoT network, and means for determining, by the IoT device, an action to perform at a target IoT based on the received data representing the context of each of the first set of IoT devices and the received data representing the current state of each of the second set of IoT devices.

A non-transitory computer-readable medium for enabling context aware actions among heterogeneous IoT devices includes at least one instruction to receive, at an IoT device, data representing a context of each of a first set of IoT devices in an IoT network, at least one instruction to receive, at the IoT device, data representing a current state of each of a second set of IoT devices in the IoT network, and at least one instruction to determine, by the IoT device, an action to perform at a target IoT based on the received data representing the context of each of the first set of IoT devices and the received data representing the current state of each of the second set of IoT devices.

An aspect of the disclosure is related to verifying an implied relationship between a first user and a second user. A method for verifying an implied relationship between a first user and a second user includes detecting an interaction between a first user device belonging to the first user and a second user device belonging to the second user storing information related to the interaction in a first interaction table associated with the first user device, assigning a relationship identifier to the second user based, at least in part, on the information related to the interaction, and determining whether or not the assigned relationship identifier is correct.

An apparatus for verifying an implied relationship between a first user and a second user includes logic configured to detect an interaction between a first user device belonging to the first user and a second user device belonging to the second user, logic configured to store information related to the interaction in a first interaction table associated with the first user device, logic configured to assign a relationship identifier to the second user based, at least in part, on the information related to the interaction, and logic configured to determine whether or not the assigned relationship identifier is correct.

An apparatus for verifying an implied relationship between a first user and a second user includes means for detecting an interaction between a first user device belonging to the first user and a second user device belonging to the second user, means for storing information related to the interaction in a first interaction table associated with the first user device, means for assigning a relationship identifier to the second user based, at least in part, on the information related to the interaction, and means for determining whether or not the assigned relationship identifier is correct.

A non-transitory computer-readable medium for verifying an implied relationship between a first user and a second user includes at least one instruction to detect an interaction between a first user device belonging to the first user and a second user device belonging to the second user, at least one instruction to store information related to the interaction in a first interaction table associated with the first user device, at least one instruction to assign a relationship identifier to the second user based, at least in part, on the information related to the interaction, and at least one instruction to determine whether or not the assigned relationship identifier is correct.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
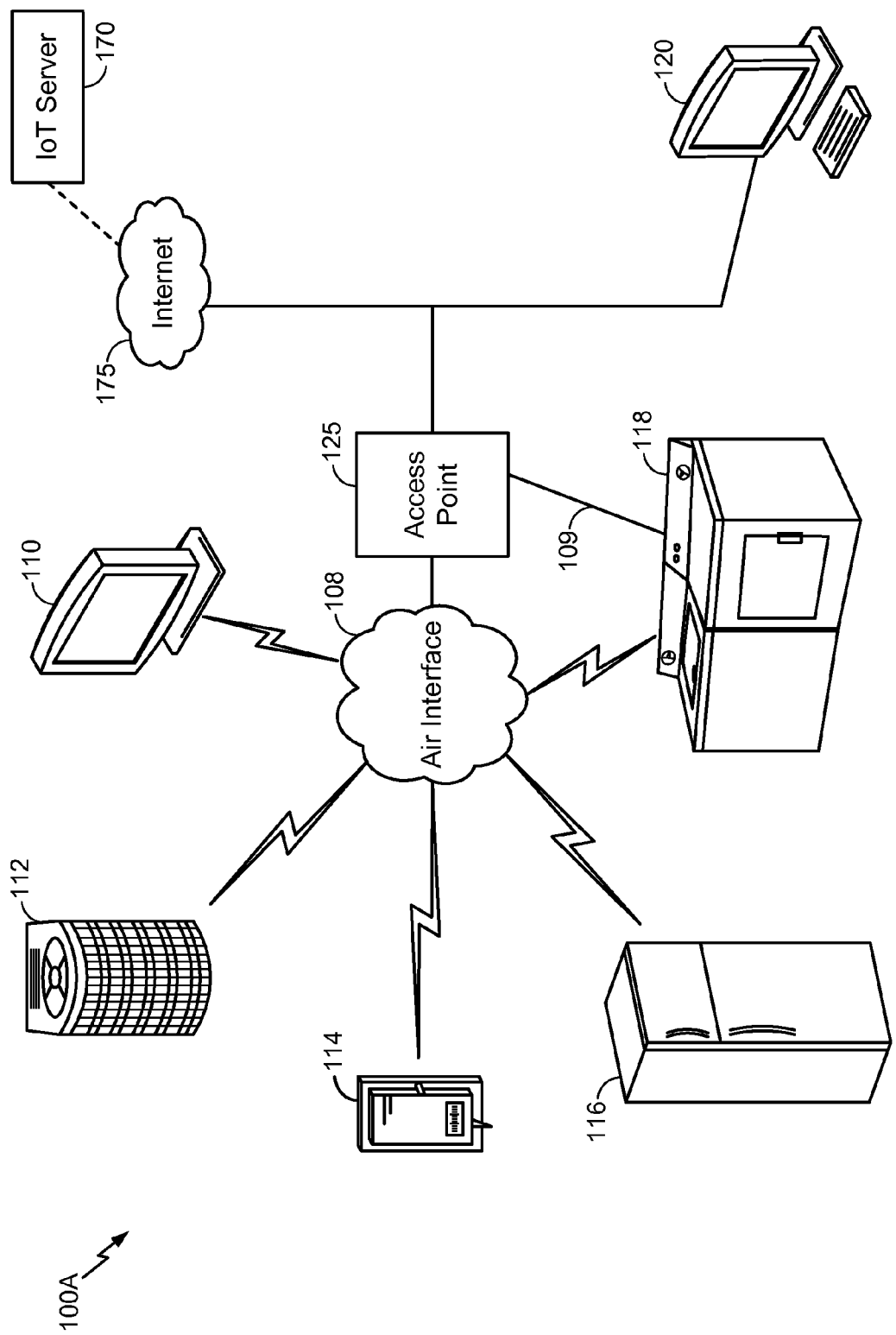
FIG. 1A illustrates a high-level system architecture of a wireless communications system in accordance with an aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-118/120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-118/120 may be a peer-to-peer (P2P) network. In such a case, the IoT devices 110-118/120 can communicate with each other directly over the air interface 108 and/or the wired connection 109. Alternatively, or additionally, some or all of IoT devices 110-118/120 may be configured with a communication interface independent of air interface 108 and wired connection 109. For example, if the air interface 108 corresponds to a WiFi interface, certain of the IoT devices 110-118/120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
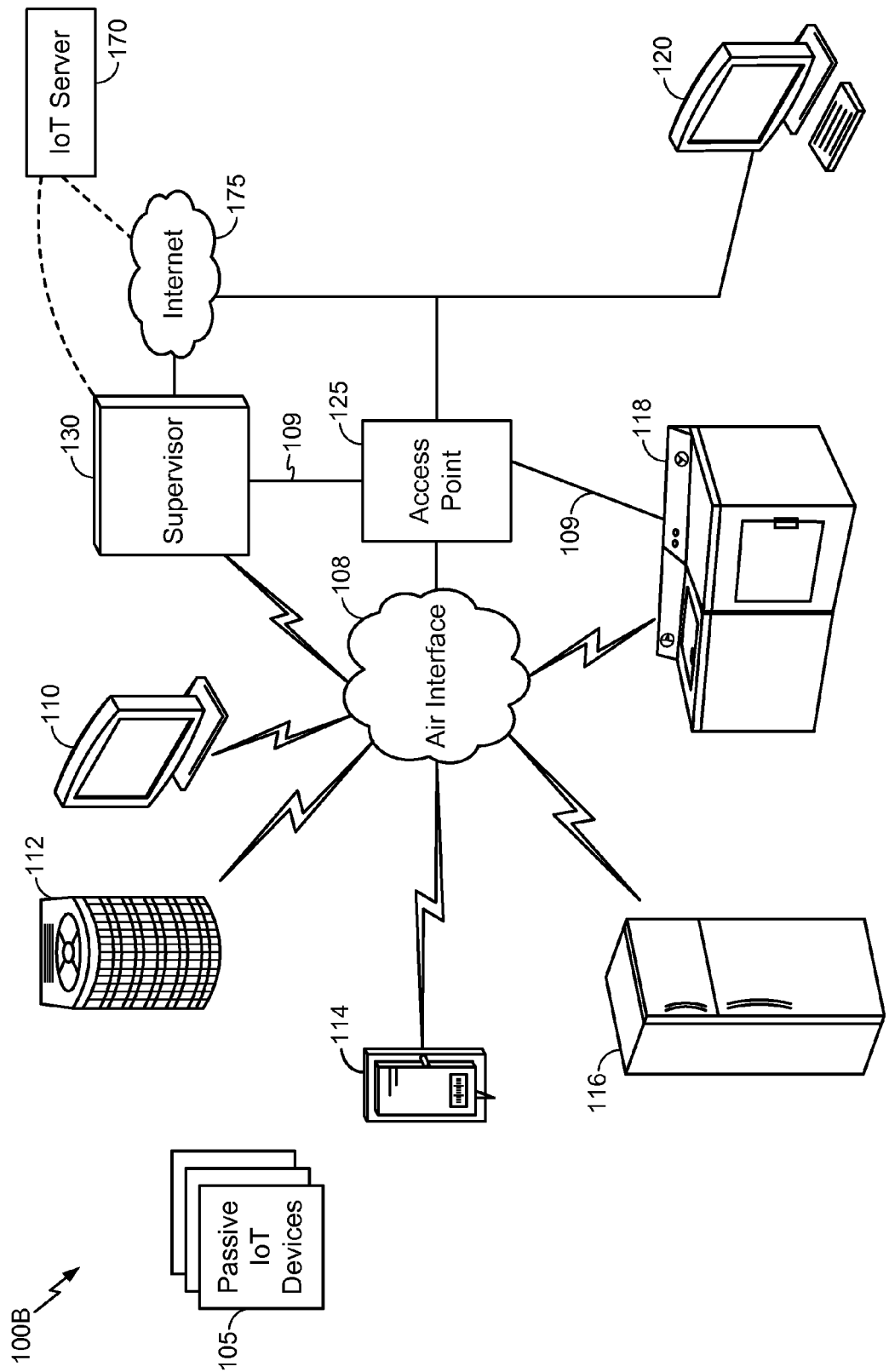
FIG. 1B illustrates a high-level system architecture of a wireless communications system in accordance with an aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130 that may be used to observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-118/120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-118/120. The supervisor device 130 may be a standalone device or one of IoT devices 110-118/120, such as computer 120. The supervisor device 130 may be a physical device or a software application running on a physical device. The supervisor device 130 may include a user interface that can output information relating to the monitored attributes, activities, or other states associated with the IoT devices 110-118/120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-118/120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RF or barcode communication interfaces, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A shown in FIG. 1A and observed, monitored, controlled, or otherwise managed in a substantially similar manner.

Figure 1C:
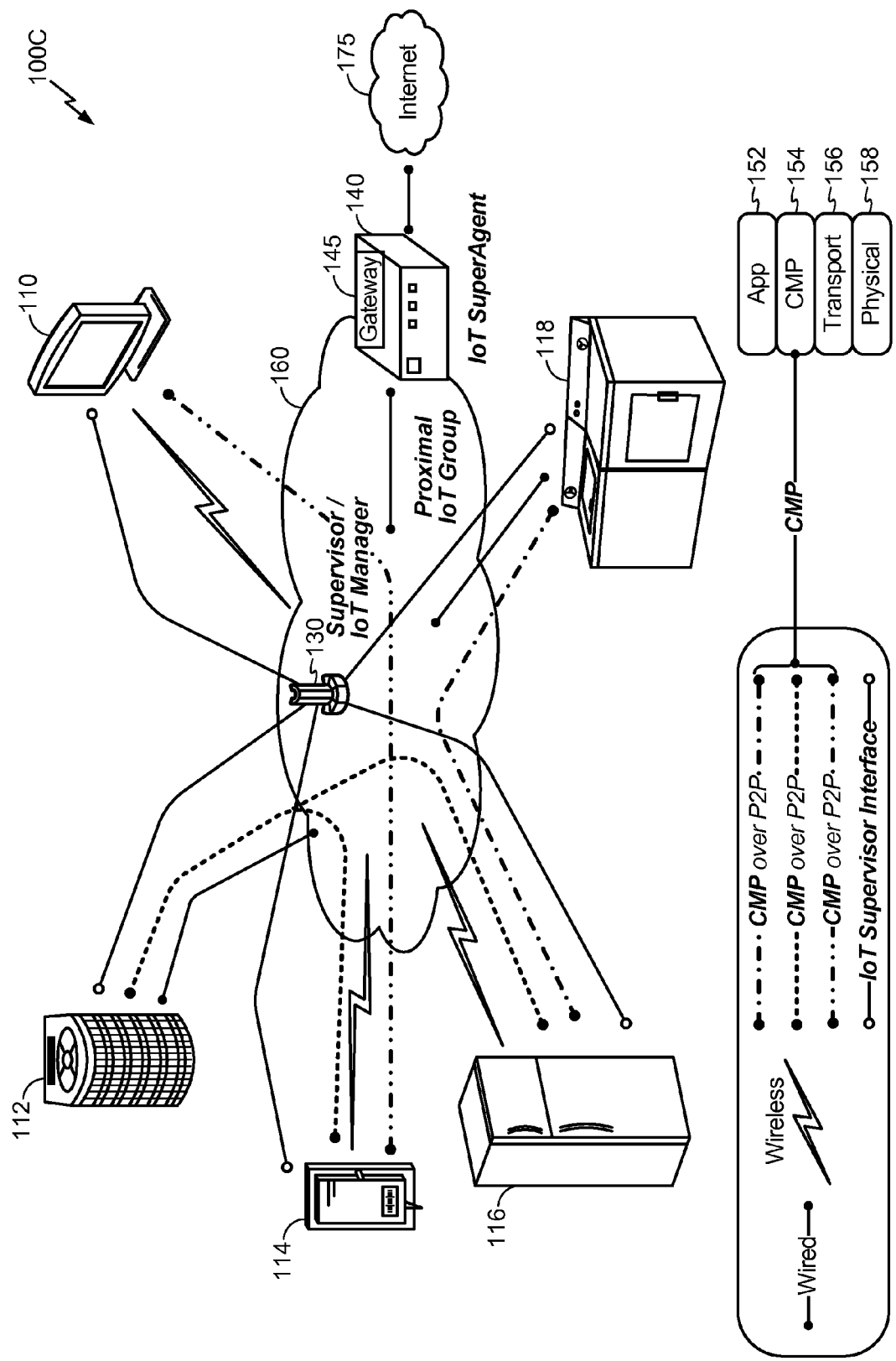
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up a proximal IoT group 160. A proximal IoT group is a group of locally connected IoT devices, such as the IoT devices connected to a user's home network. Although not shown, multiple proximal IoT groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor 130 and the IoT SuperAgent 140 may be, or reside on, the same device. This may be a standalone device or an IoT device, such as computer 120 in FIG. 1A. Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
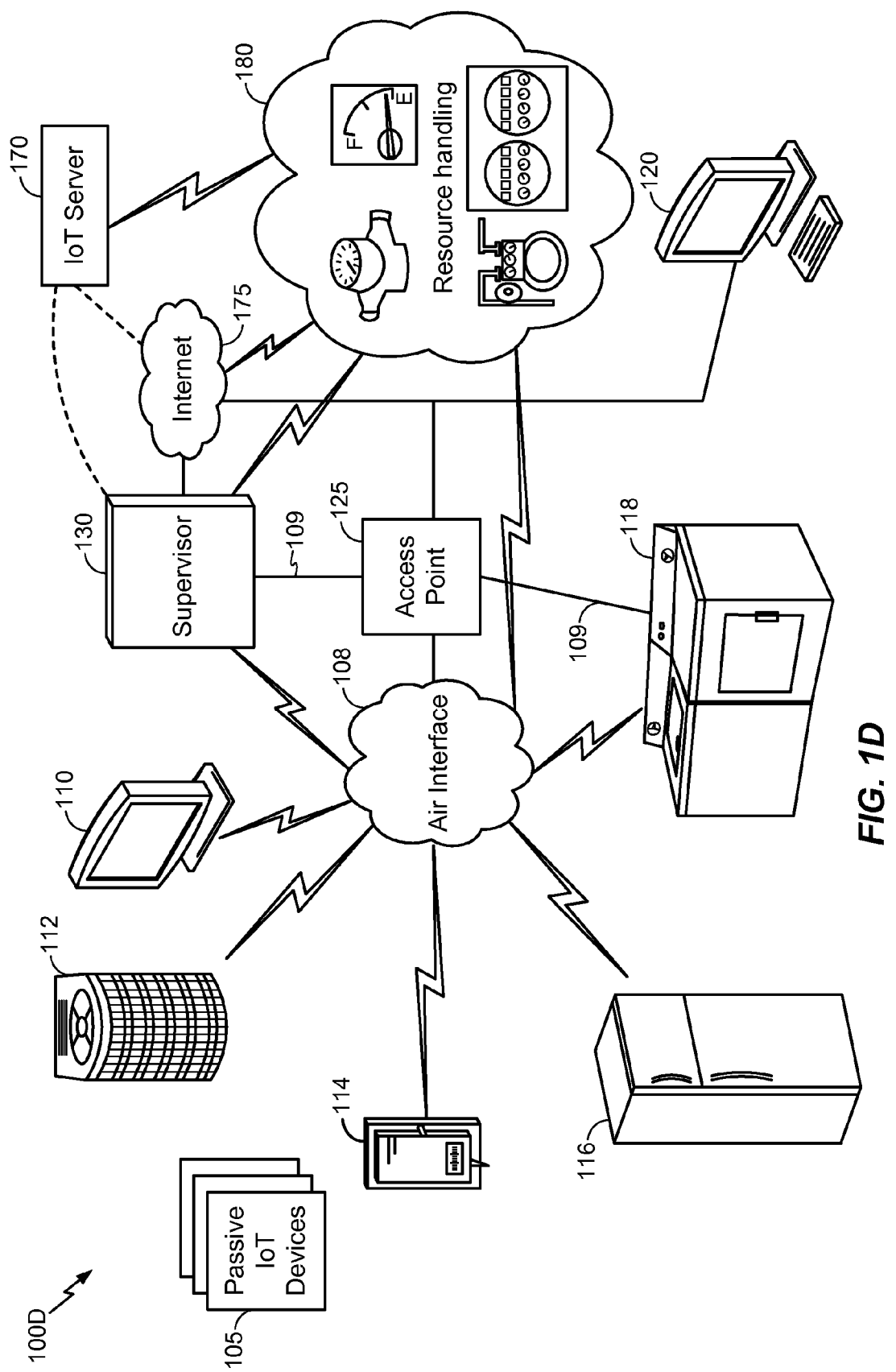
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIG. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet is a "resource" that can be regulated using the concept of the IoT. However, the Internet is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet. FIG. 1D illustrates several resources 180, such as natural gas, gasoline, hot water, and electricity, that can be regulated in addition to the Internet 175, or that can be regulated over the Internet 175.

IoT devices can communicate with each other to regulate their use of a resource. For example, IoT devices such as a toaster, a computer, and a hairdryer may communicate with each other over a Bluetooth communication interface to regulate their use of electricity (the resource). As another example, IoT devices such as a desktop computer, a telephone, and a tablet computer may communicate over a WiFi communication interface to regulate their access to the Internet (the resource). As yet another example, IoT devices such as a stove, a clothes dryer, and a water heater may communicate over a WiFi communication interface to regulate their use of gas. Alternatively, or additionally, each IoT device may be connected to an IoT server, such as IoT server 170, that has logic to regulate their use of the resource based on information received from the IoT devices.

Figure 1E:
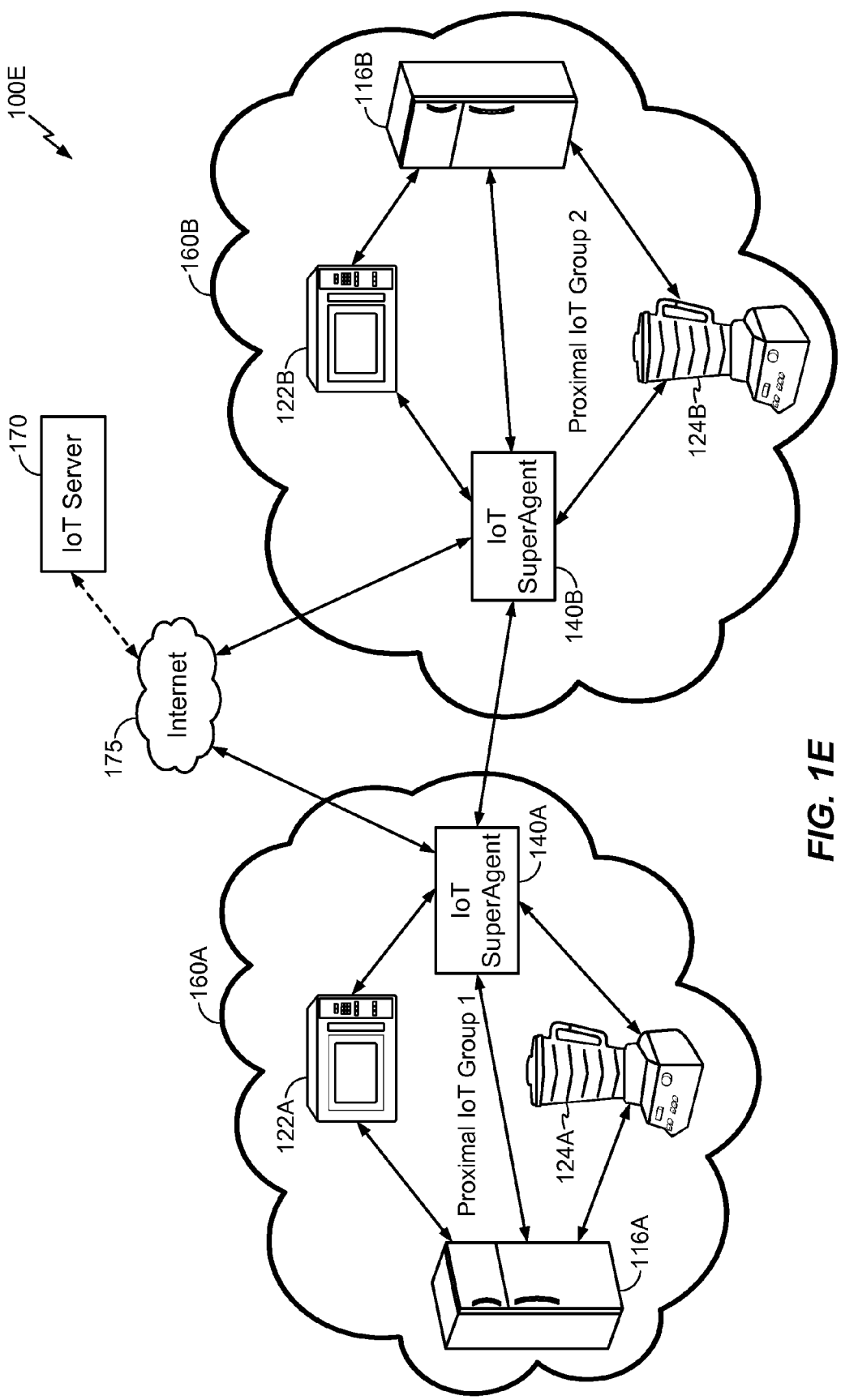
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIG. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two proximal IoT groups 160A and 160B. Multiple proximal IoT groups may be connected to and/or communicate with each other via an IoT SuperAgent connected to the Internet 175. At a high level, an IoT SuperAgent manages inter-group communications. In FIG. 1E, the proximal IoT group 160A includes IoT devices 116A, 122A, and 124A and an IoT SuperAgent 140A. The proximal IoT group 160B includes IoT devices 116B, 122B, and 124B and an IoT SuperAgent 140B. IoT SuperAgents 140A and 140B are connected to Internet 175 and may communicate with each other over the Internet 175 or directly. The IoT SuperAgents 140A and 140B facilitate communication between the proximal IoT groups 160A and 160B. Although FIG. 1E illustrates two proximal IoT groups communicating with each other via IoT SuperAgents 160A and 160B, any number of proximal IoT groups may communicate with each other using IoT SuperAgents.

Figure 2A:
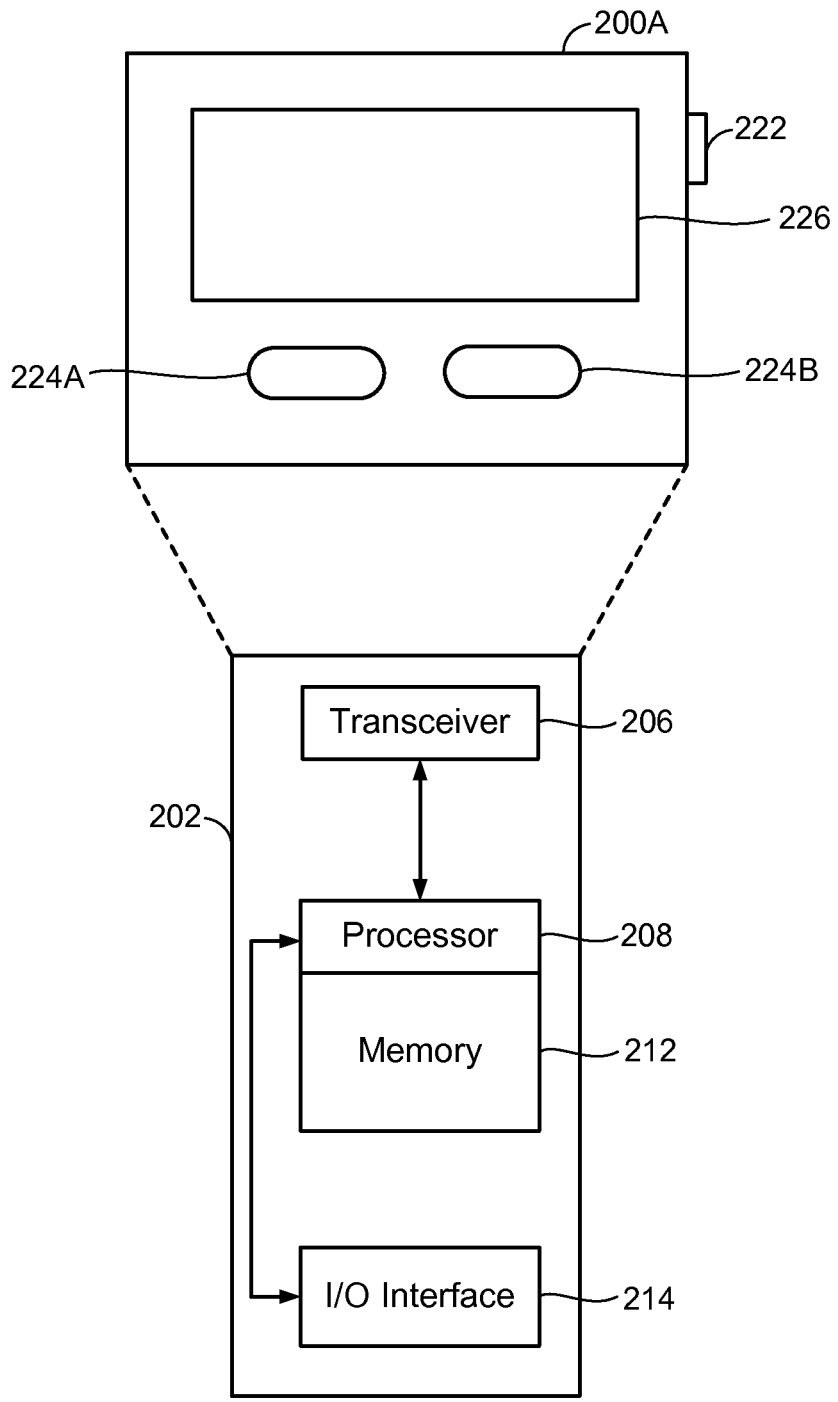

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B and D.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and D and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
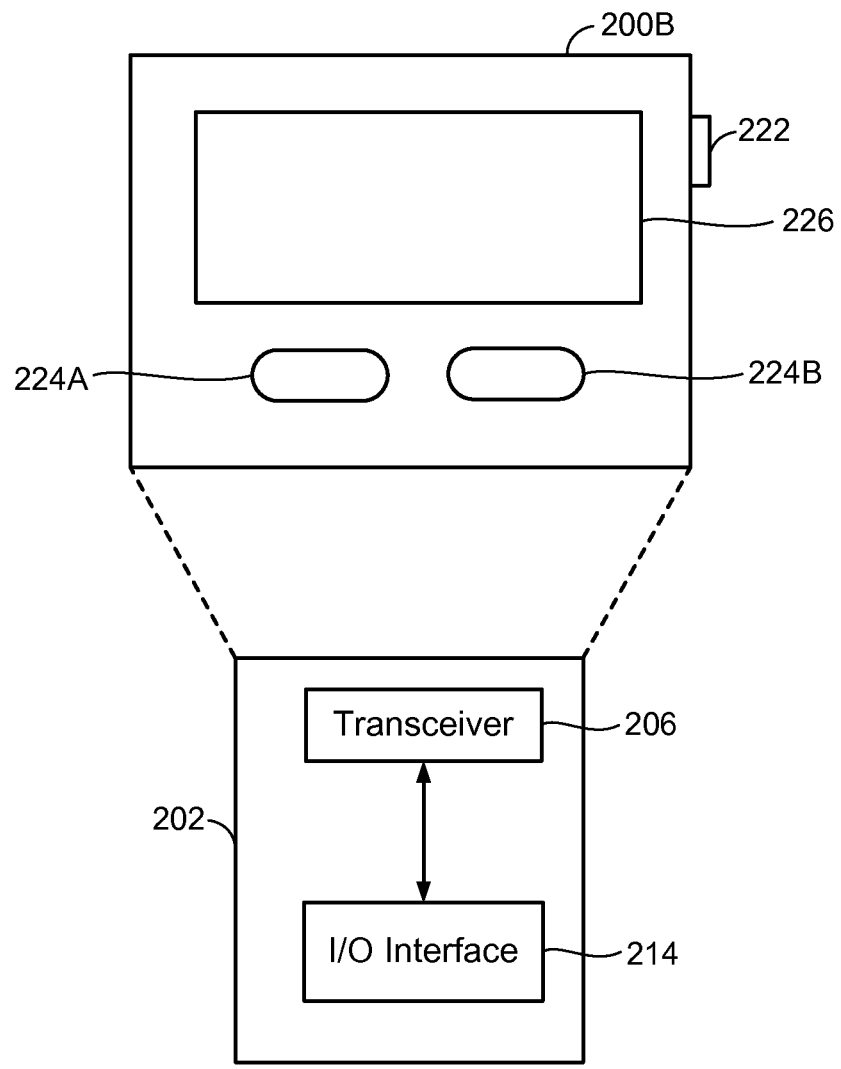
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200A may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Figure 3:
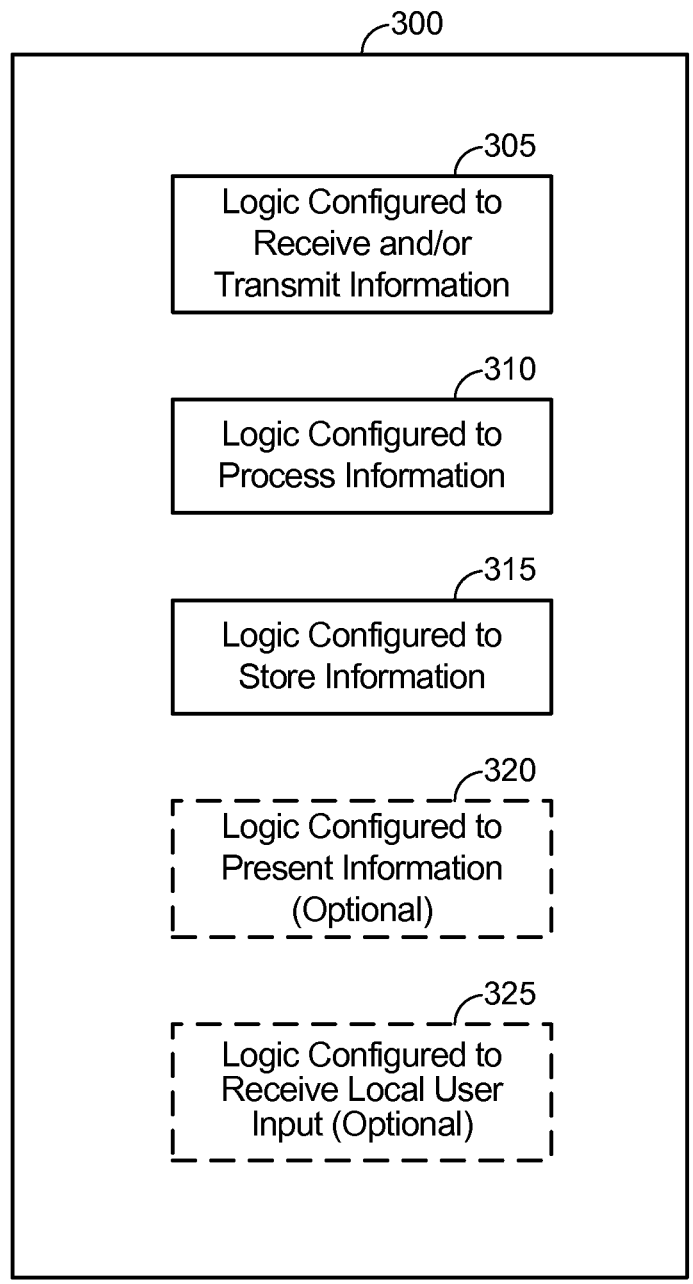
FIG. 3 illustrates a communication device that includes logic configured to perform functionality in accordance with an aspect of the disclosure.

Although the foregoing describes the passive IoT device 200B as having some form of RF, barcode, or other I/O interface 214, the passive IoT device 200B may comprises a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network. FIG. 3 illustrates a communication device 300 that includes logic configured to perform functionality. The communication device 300 can correspond to any of the above-noted communication devices, including but not limited to IoT devices 110-118/120, IoT device 200, any components coupled to the Internet 175 (e.g., the IoT server 170), and so on. Thus, communication device 300 can correspond to any electronic device that is configured to communicate with (or facilitate communication with) one or more other entities over the wireless communications systems 100A-E of FIGS. 1A-E.

FIG. 3 illustrates a communication device 300 that includes logic configured to perform functionality. The communication device 300 can correspond to any of the above-noted communication devices, including but not limited to IoT devices 110-118/120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-E of FIGS. 1A-E.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the IoT server 170), the logic configured to receive and/or transmit information 305 can correspond to an Ethernet card, in an example, that connects the network-based server to other communication entities via an Ethernet protocol. As an example, the logic configured to receive and/or transmit information 305 may include logic configured to receive, at an IoT device, data representing a context of each of a first set of IoT devices in an IoT network, and logic configured to receive, at the IoT device, data representing a current state of each of a second set of IoT devices in the IoT network. As another example, the logic configured to receive and/or transmit information 305 may include logic configured to detect an interaction between a first user device belonging to the first user and a second user device belonging to the second user. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the logic configured to process information 310 may include logic configured to receive, at an IoT device, data representing a context of each of a first set of IoT devices in an IoT network, logic configured to receive, at the IoT device, data representing a current state of each of a second set of IoT devices in the IoT network, and logic configured to determine, by the IoT device, an action to perform at a target IoT based on the received data representing the context of the first set of IoT devices and the received data representing the current state of the second set of IoT devices. As another example, the logic configured to process information 310 may include logic configured to detect an interaction between a first user device belonging to the first user and a second user device belonging to the second user, logic configured to store information related to the interaction in a first interaction table associated with the first user device, logic configured to assign a relationship identifier to the second user based, at least in part, on the information related to the interaction, and logic configured to determine whether or not the assigned relationship identifier is correct. The processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
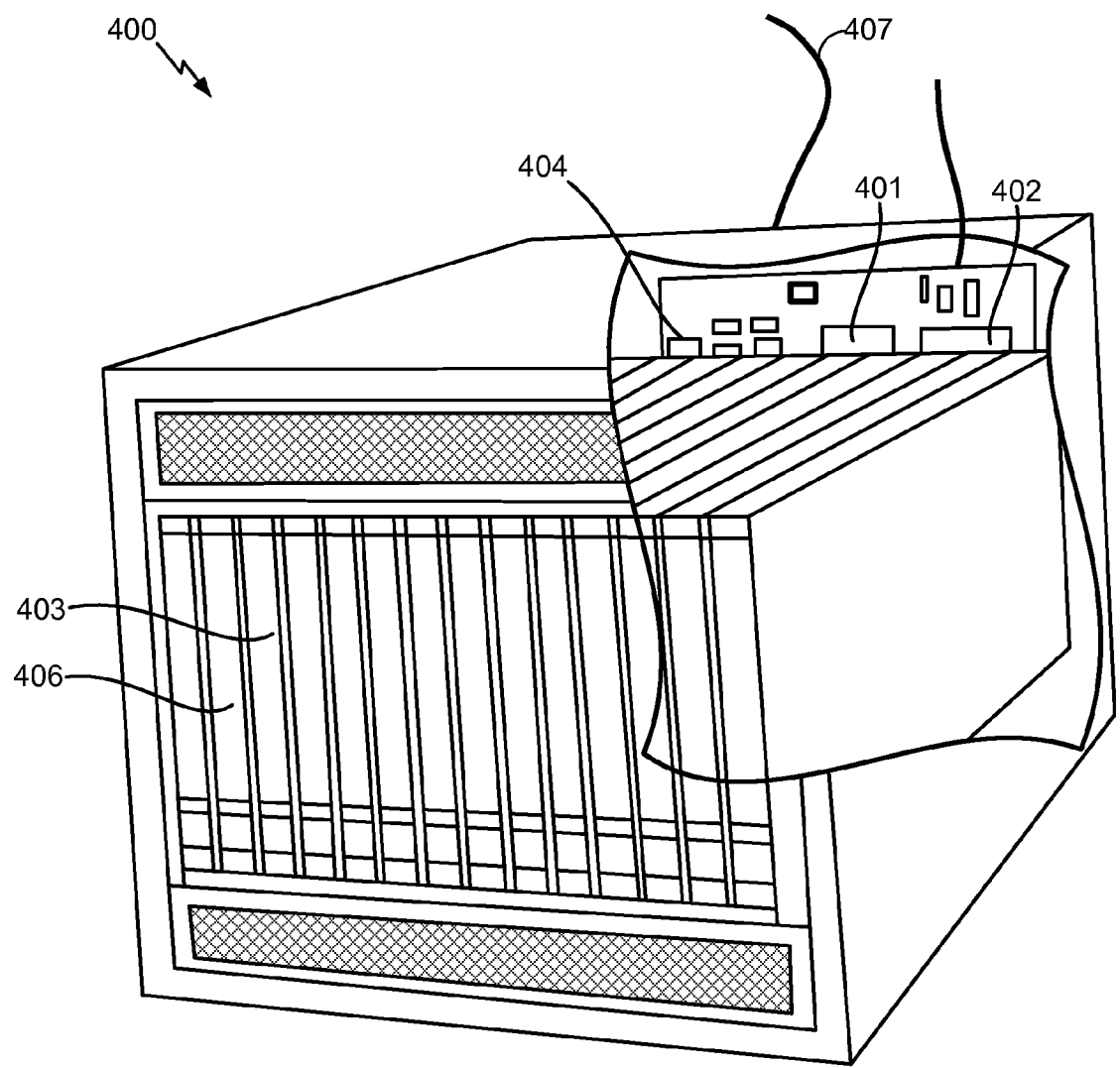
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

IP based technologies and services have become more mature, driving down the cost and increasing availability of IP. This has allowed Internet connectivity to be added to more and more types of everyday electronic objects. The IoT is based on the idea that everyday electronic objects, not just computers and computer networks, can be readable, recognizable, locatable, addressable, and controllable via the Internet.

There is an increasing need for a variety of heterogeneous IoT devices to be able to communicate with each other. IoT devices need to be cognizant of each other's presence, status, and environment in order to perform context aware actions and/or commands on a collective basis.

Accordingly, the disclosure provides a framework to leverage context awareness derived from a function of various schema elements of heterogeneous IoT devices, such as space, time, location, status/events, association lists, association ranks, and/or inter-dependencies, to enable the heterogeneous IoT devices to perform a set of actions/commands. These context aware interactions are referred to as "actions/commands" because one IoT device issues a command or trigger and the other IoT device performs a corresponding action or state change.

IoT devices can be made cognizant of each other by virtue of a global universal identifier (GUID) and can establish context awareness with respect to other IoT devices by leveraging the vocabularies of the other IoT devices. The "vocabulary" of an IoT device defines how to communicate with the IoT device, and can be included in or derived from a schema of the IoT device. Schema elements and their corresponding schema element values make up the vocabularies of the IoT devices. Schema elements may include, but are not limited to, space, time, location, status/events, association lists, association ranks, inter-dependencies, and/or the like. The schema, and thus the vocabulary, of an IoT device can be obtained using the GUID of the IoT device.

By being aware of the context of other IoT devices, an IoT device can perform a set of actions/commands based on a trigger derived from the context of the other IoT devices. That is, an IoT device may detect a change in the context of one or more other IoT devices and, in response, perform an action or a state change. Alternatively, an IoT device may perform an action or change its state and, in response, command one or more other IoT devices to perform an action or change its state.

There may be a chain of actions/commands performed by a chain of IoT devices. That is, one or more first IoT devices may detect a context of one or more other IoT devices and perform one or more actions in response. One or more second IoT devices may detect the new state of the first IoT device(s), and in response, perform one or more actions. One or more third IoT devices may detect the new state of the second IoT device(s) and perform one or more actions in response, and so on. The first, second, and third sets of IoT devices may overlap. That is, IoT devices in the first set may be in the third set, IoT devices in the second set may be in the third set, and so on.

As an example, if a permissible context applicable to an authorized IoT device is absent, action/command pairs could include actions/commands such as shut down, lock down, inoperable, and the like. For example, when a parent's IoT device is not in the living room, the television (a context-aware IoT device) can restrict remote control operation by the child, allow toggling across PG rated content only, power off after a five minute timeout, or the like.

The actions/commands performed by an IoT device can be tailored to the GUID and the vocabulary of the one or more other IoT devices to which the IoT device is reacting. For example, if a child is sleeping in a room with the lights turned off, the smart lighting in the room (a context-aware IoT device) can remain off based on the state of the child. The state of the child may be derived from the state of the child's shoes, watch, and/or a sensor on the child. If a parent walks in to check on the child, the context-aware and cognizant smart lighting IoT device can react to the context combination of the parent and child being in the same room by performing a smart action of lighting up to a 10% dimmed state.

In the previous example, the context derived and the action performed may be represented as:

Context={GUID_Parent, GUID_Child, Action: GUID_ParentEnterRoom, GUID_ChildAsleep, Time: 22:00 Hrs}

Action={GUID_SmartLight, Action: LowLuminosityState, Status: 10% Dimmed}

Figure 5A:
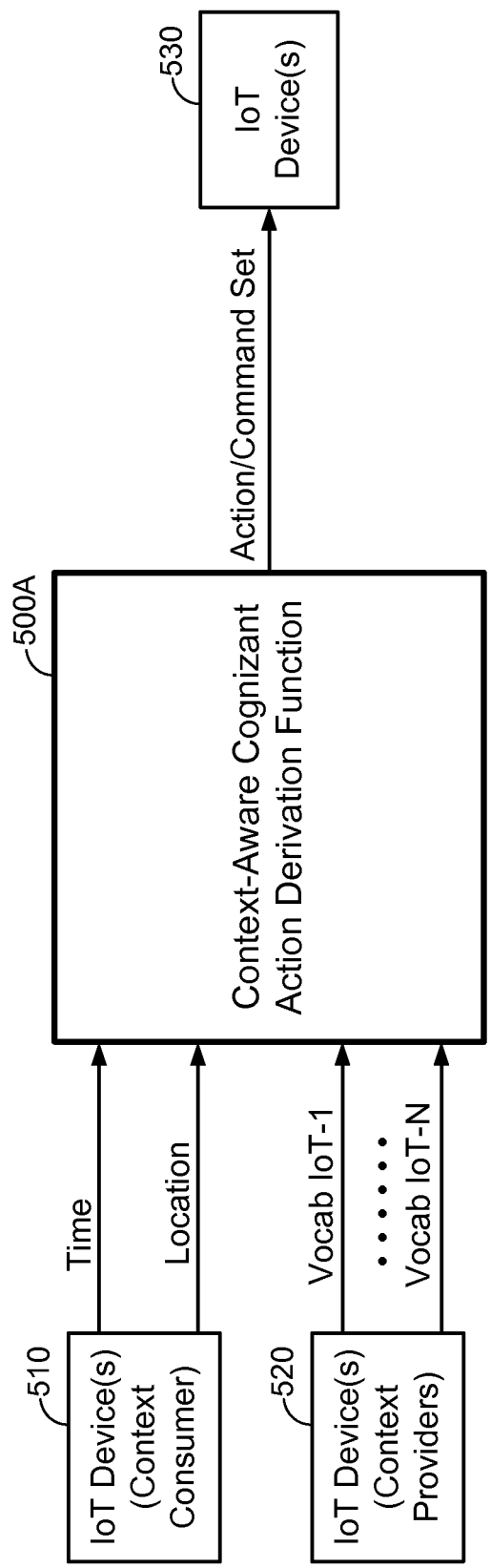
FIG. 5A illustrates an exemplary context-aware cognizant action derivation function implemented by a first IoT device.

FIG. 5A illustrates an exemplary context-aware cognizant action derivation function 500A implemented by a first IoT device. The derivation function 500A receives as inputs the vocabularies of one or more IoT devices, illustrated as IoT device(s) 520. IoT device(s) 520 provide the context that the derivation function 500A uses to issue any actions/commands to one or more IoT devices, illustrated as IoT device(s) 530. The set of IoT device(s) 520 may, but need not, overlap with the set of IoT device(s) 530.

The derivation function 500A also receives as inputs various schema element values from one or more IoT devices, illustrated as IoT device(s) 510, such as the current time and the location of the IoT device(s) 510. Based on the received inputs, the derivation function 500A derives one or more action/command sets and sends them to the IoT device(s) 530. The set of IoT device(s) 510 may, but need not, overlap with the set of IoT device(s) 530. Additionally, the set of IoT device(s) 520 may, but need not, overlap with the set of IoT device(s) 510.

The IoT device implementing the derivation function 500A may be any of IoT device(s) 510, 520, or 530 or a separate IoT device. Alternatively, the derivation function 500A may be implemented by a server, such as IoT server 170, or a supervisor device, such as supervisor device 130.

Figure 5B:
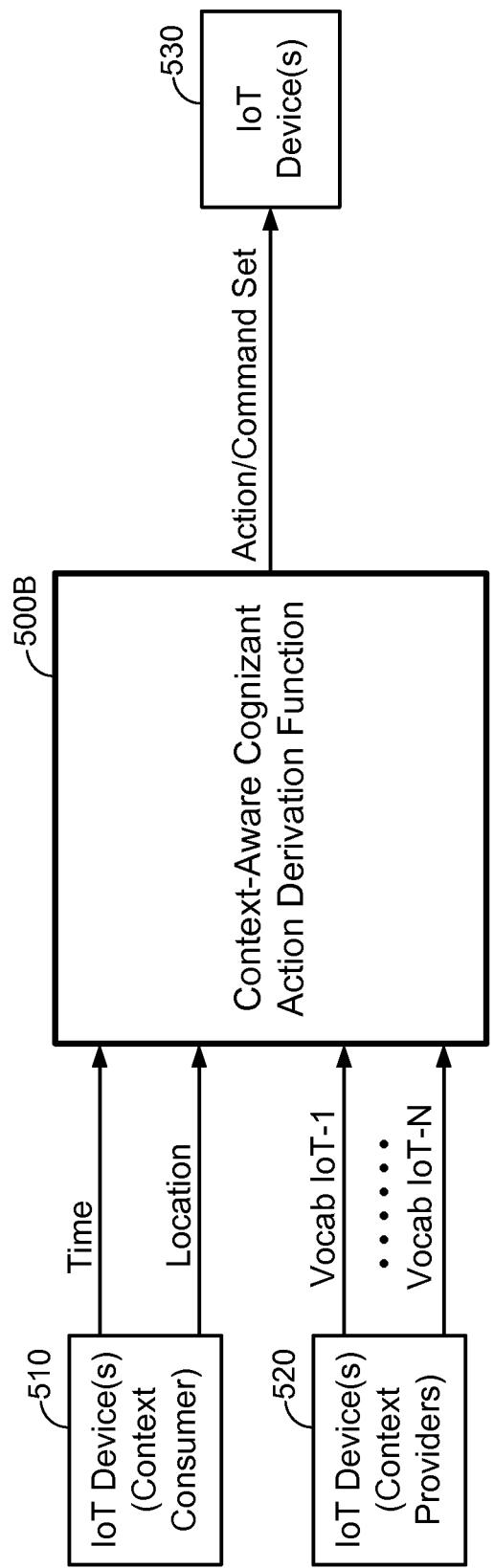
FIG. 5B illustrates an exemplary context-aware cognizant action derivation function implemented by a second IoT device.

Each IoT device in an IoT network may be able to execute a derivation function. Different IoT devices implementing the derivation function could make different decisions, and thus provide different actions/commands, based on the same inputs. This is illustrated in FIG. 5B. FIG. 5B illustrates an exemplary context-aware cognizant action derivation function 500B implemented by a different IoT device than the IoT device implementing derivation function 500A.

As with the derivation function 500A, the derivation function 500B receives as inputs the vocabularies of IoT device(s) 520 and various schema element values from IoT device(s) 510. IoT device(s) 520 provide the context that the derivation function 500B uses to issue any actions/commands to IoT device(s) 530. Based on the received inputs, the derivation function 500B derives one or more action/command sets and sends them to the IoT device(s) 530. The action/command set determined by derivation function 500B may be different than the action/command set determined by derivation function 500A.

IoT devices can further leverage association ranks of the other IoT devices to perform the determined actions. As an example, an IoT device can use the association ranks to determine commonality with respect to actions it can perform for target IoT device(s) in the instance of ranking ties. For example, a music system in the living room (a context-aware IoT device) may be playing a first genre of music for a first person (carrying a first IoT device). If a second person (carrying a second IoT device) walks into the room, the music system can switch to a music genre that both the first person and the second person like (an identified commonality) or continue playing the first genre of music if the association rank of the first person (determined from the first IoT device) is greater than the association rank of the second person (determined from the second IoT device). Alternately, the music system can ignore the context event of the second person walking into the room if it does not have a vocabulary for the second person (i.e., the second IoT device) in its vocabulary association list.

As another example, an IoT device can make a skewed action as a function of the association ranks. For example, a first person (carrying a first IoT device) may like room lighting set to a daylight color temperature, such as 5000K, while a second person (carrying a second IoT device) may prefer a warmer tone, such as 2700K. A smart lighting system (an IoT device) may detect or determine that the first person has an association rank of 8, for example, and that the second person has an association rank of 3, for example. Based on the association ranks, the smart lighting system can perform a skewed action as a compromise between the preferences of the first person and the second person. The smart lighting system may set the color temperature to 4300K, for example, based on the association rank of the first person and the association rank of the second device.

Figure 6:
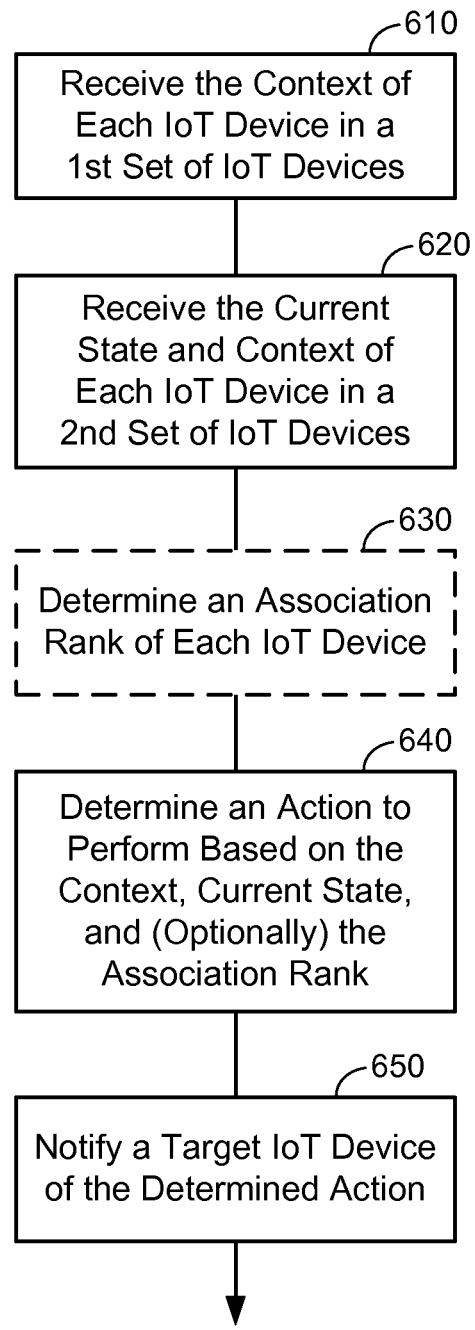
FIG. 6 illustrates an exemplary flow for enabling context aware actions among heterogeneous IoT devices.

FIG. 6 illustrates an exemplary flow for enabling context aware actions among heterogeneous IoT devices. The flow illustrated in FIG. 6 may be performed by a server for the IoT network, such as IoT server 170, a supervisor device, such as supervisor device 130, the target IoT device, or any of the IoT devices in the network of IoT devices.

At 610, data representing a context of each of a first set of IoT devices in the IoT network is received. The data representing the context of each of the first set of IoT devices may include data representing profiles of each of the first set of IoT devices. A profile of an IoT device includes schema elements and corresponding values of the IoT device, such as an identifier, make, model, time, location, status, events, association lists, association ranks, and/or inter-dependencies of the IoT device.

At 620, data representing a current state and context of each of a second set of IoT devices in the IoT network is received. The data representing the current state of each of the second set of IoT devices is the current value of any schema element of the IoT device, and may include, but is not limited to, the GUID, status, make, model, time, location, status, events, association lists, association ranks, inter-dependencies, and the like, of the IoT device.

If the flow of FIG. 6 is being performed by an IoT device, the IoT device may receive the context data from the first set of IoT devices and the current state data from the second set of IoT devices. Alternatively, the IoT device may receive this data from a server for the IoT network. If the flow of FIG. 6 is being performed by a server or supervisor device for the IoT network, the server/supervisor device may receive the context data from the first set of IoT devices and the current state data from the second set of IoT devices. Alternatively, the server/supervisor device may retrieve this data from its memory.

At 630, an association rank of each IoT device in the first and/or second sets of IoT devices may optionally be determined. The association rank provides the relative importance of an association between the IoT device and the other IoT devices. The association rank may also, or alternatively, provide the relative importance of the IoT device compared to associated other IoT devices.

At 640, an action to perform at the target IoT is determined based on the received schema elements and their corresponding values, such as the schema elements representing the context data, the received current state data, and optionally the determined association ranks. The action may be determined using a context-aware cognizant action derivation function, such as derivation function 500A in FIG. 5A. Where the target IoT performs the flow of FIG. 6, the target IoT can use its own schema elements (including current state) and any other number of associated or unassociated IoT devices to ascertain the context aware action to be performed. Referring back to FIGS. 5A and 5B, this can cause the difference in the action/command sets generated by the derivation functions 500A and 500B. Additionally, the difference may be caused by different association ranks determined by the different IoT devices implementing the derivation functions.

At 650, the target IoT device is notified of the determined action. If a server or a non-target IoT device is performing the flow of FIG. 6, then the server can send a notification message to the target IoT device that includes the action to perform. If the target IoT device is performing the flow of FIG. 6, then the notification may simply be the output from the context-aware cognizant action derivation function.

The IoT permits connected devices to interact with each other in other ways as well. For example, relationships between IoT devices (and by extension their users) can be defined based on interactions between the IoT devices.

As discussed above, each IoT device can be assigned a unique identifier, such as a GUID. Each IoT device of a given user can have a local database that stores information about each interaction it has with IoT devices of other users. The interactions can be proximity detections, text messages, multimedia messages, phone calls, emails, etc. A proximity detection may include a proximity check, such as a Listen Location (LILO) proximity check, a Bluetooth pairing, communication over the same local wireless network, or any other interaction between two UEs that indicates that they are proximate to each other. Alternatively, or additionally, a server, such as IoT server 170, may determine that two or more IoT devices are proximate each other based on locations of IoT devices stored at the server. The IoT devices can periodically (e.g., every few minutes, several times an hour, etc.) transmit their locations to the server, which can compare the received locations to determine which IoT devices are within a threshold distance of each other. The threshold may be a few meters, or some other threshold that indicates that the IoT devices likely belong to users that are interacting with each other.

The IoT device interactions can be stored in one or more interaction tables at an IoT device and uploaded to the server periodically (e.g., every few hours, once per day, etc.) or on request. Alternatively, the interactions could be uploaded to the server as they occur in real time and added to interaction tables stored on the server. In this case, there need not be an interaction table on the IoT device. Each user may decide how they wish their user interaction table to be stored. For example, some users may wish to store it on their IoT device and have the server request it, or only the necessary entries, as needed, while other users may wish to simply upload their interactions to a remote interaction table stored on the server.

Interaction tables can be organized by identifiers of the IoT devices to which they correspond. An interaction table can store an identifier of the user, an identifier of the user's IoT device, an identifier of the other user, an identifier of the other user's IoT device, the type of interaction (e.g., proximity, email, text message, phone call, etc.), the location of the interaction, if applicable, and the time and/or length of the interaction (e.g., the time the interaction began/ended).

One user may be associated with a number of IoT devices. An interaction table may store all interactions for each IoT device that occur over the life of the IoT device (i.e., the time during which the IoT device is in use by the same user) or only a certain number of interactions, such as the interactions over the last year or the last 1000 interactions.

Using its stored interaction table, an IoT device can assign a relationship value to each other user listed in its interaction table. Alternatively, if the server stores the interaction tables, the server can assign the relationship values and, optionally, communicate them to the IoT device. The more times an IoT device interacts with IoT device(s) of another user, the stronger it can imply the relationship is between the users. The strength and/or type of the relationship can also be based on the type and/or location of the IoT devices and/or the time of the interaction. Based on these factors, the IoT device can imply the relationship between the users.

There can be a hierarchy of relationships, such as Acquaintance, Coworker, Golf Buddy, Friend, Close Friend, Family, and the like. Alternatively, the relationships could be numbered from one to five or one to ten, where one is the weakest and five or ten is the strongest, for example. At the first meeting between two IoT devices, the relationship may be assigned the lowest ranking. Over time, the IoT device may increase or decrease the rank or hierarchy level of the implied relationship based on further interactions between the IoT device and the IoT device(s) of the other user.

For example, at a first interaction between two users, their IoT devices may record that they are Acquaintances. After a certain number of interactions, and perhaps within a certain time period, the IoT devices can upgrade their users' relationship to Friends. From there, various heuristics can be used to determine whether or not certain users are Family members.

It is important to assign the appropriate relationship level to each relationship. For example, while a user may share an office with a coworker and spend many hours a day with that coworker, the user's relationship to his or her mother, with whom the user spends less time, is considerably more significant. Accordingly, the user's relationship to his or her mother should be assigned a higher relationship level than his or her relationship to the coworker, even though the user spends much more time with the coworker.

A statistical weight system can provide a methodology to gauge each relationship. The weighting system can take into account the types of the interacting IoT devices, the location of the interacting IoT devices, the time of day, the frequency of the interactions, the number of interactions, the length of the interaction, and/or the like in determining the relationship level to assign to a user.

The location of an IoT device does not necessarily refer to its geographic position, but rather can refer to its relative location, such as the user's home, the user's workplace, a particular restaurant, a particular room, a particular floor of a building, etc. An IoT device can determine its relative location, such as in which room it is located, from the types of proximate IoT devices and/or from environmental clues, for example. As an example, if the IoT device detects that it is proximate a smart refrigerator, it can determine that it is in the user's kitchen. Or if the IoT device detects the sound of intermittently running water or a chopping knife, it can determine that it is in the kitchen.

When leveraging the location of an IoT device to imply the relationship between two users, certain locations may be more meaningful than others. For example, time spent at home can be considered more important than time spent outside of the home, such as at work. Knowing that the user's IoT device is in a particular room can be relevant in implying relationships. For example, if, when in the kitchen, the user's IoT device detects a visitor's IoT device, meaning the visitor is in the kitchen, the user's IoT device can imply that the visitor has a relationship with the homeowner of Friend or higher, since first time acquaintances do not typically enter a person's kitchen.

Further, the frequency of interactions with other IoT devices at a particular location can be meaningful. Referring to the above example, if the user's IoT device rarely detects other user devices when it is in the kitchen, it may indicate that the user does not have many visitors, or does not invite many visitors into the kitchen, and as such, any visitor in the kitchen should be assigned a higher relationship weight than would otherwise be assigned to a visitor in the kitchen. In contrast, if the user's IoT device frequently detects other user devices in the kitchen, it may indicate that the user invites anyone into the kitchen, and as such, any visitor in the kitchen should be assigned a lower relationship weight than would otherwise be assigned to a visitor in the kitchen.

As another example, if a user's IoT device knows that the user is at work, then any meetings with other IoT devices, even if occurring frequently, will not necessarily imply a strong relationship. Likewise if the user is at a public location, such as a coffee shop, any meetings with other IoT devices, even if occurring frequently, will not necessarily imply a strong relationship. Rather, the relationships may be classified as having the weakest relationship level, such as Acquaintance. However, if the user's IoT device detects a work IoT device at a non-work location, then the relationship between the users can be increased. For example, if a work IoT device is detected in the user's home, then the relationship between the users can be increased to Friend.

The frequency with which an IoT device goes to a particular location can be leveraged to imply the relationship between two users. For example, if a user frequently eats at a fast food restaurant, any other users with whom that user comes in contact may only be assigned a lower tier relationship, such as Acquaintance. However, the first time that user goes to a high-end restaurant with another user, even if the first user has not interacted with the second user before, the second other user may be assigned a higher tier relationship, such as Friend.

The time at which a user's IoT device interacts with another IoT device can also be leveraged to imply the relationship between the users. For example, if the user's IoT device detects a particular IoT device at a set time every month, the IoT device may determine that this is not a very important user and assign a low rank to the relationship. However, if the IoT device detects another IoT device every night, the IoT device may determine that this is an important user and assign a higher rank to the relationship. To make the strongest, or most accurate, relationship determination, the IoT device can leverage all of the determinable factors of the meeting, such as the frequency, location, and time of the meeting, the type of the IoT devices, and the like.

Once a relationship has been implied, it would be beneficial to verify that the IoT device implied the correct relationship. This can be accomplished using a simple user interface that asks the user if the implied relationship is correct. For example, the user interface may display the question, "Is the person you are with a 'good friend?'" The user may be able to select "Yes" or "No." If the user selects "No," the IoT device may guess again or present the user with a list of relationship types that the user can select. Alternatively, the IoT device may wait for further interactions before presenting another guess to the user. In this way, the IoT device can verify the classification of the relationship.

Figure 7:
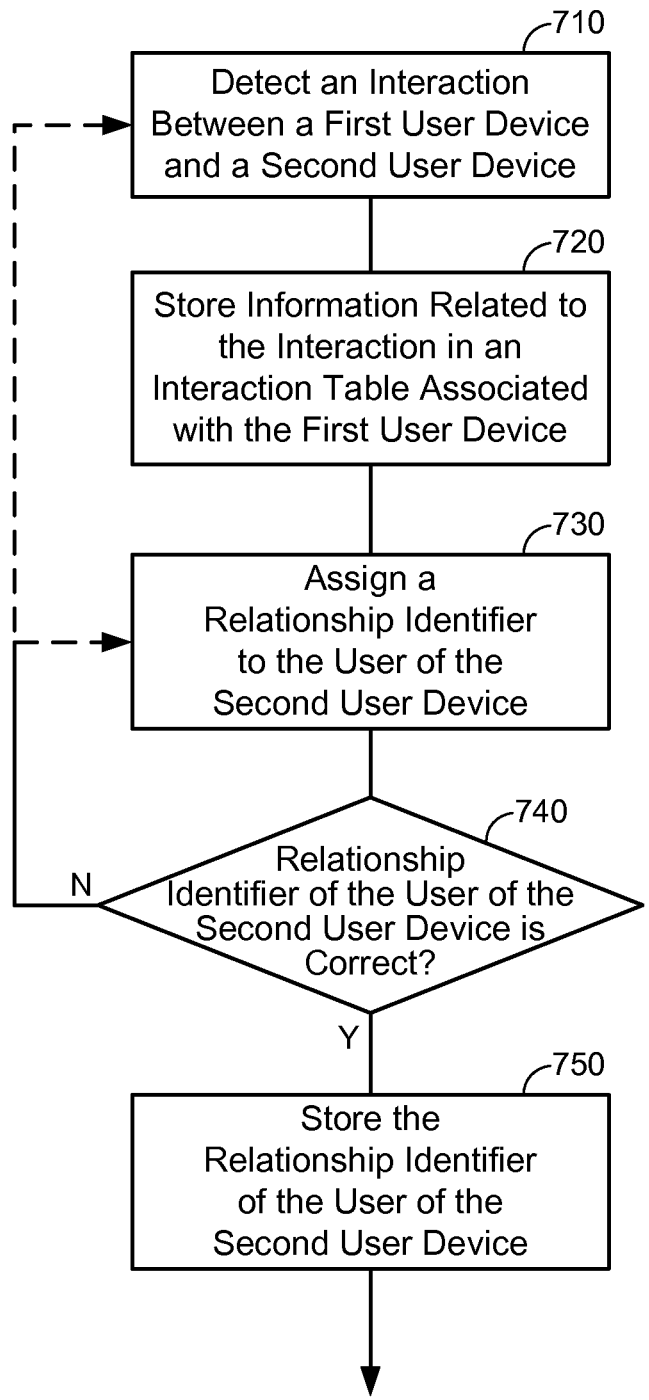
FIG. 7 illustrates an exemplary flow for verifying an implied relationship between a first user and a second user.

FIG. 7 illustrates an exemplary flow for verifying an implied relationship between a first user and a second user. The flow illustrated in FIG. 7 may be performed by an IoT device, such as IoT devices 110, 112, 114, 116, 118, 120, 200, or 300, a supervisor device, such as supervisor device 130, or a server, such as IoT server 170.

At 710, an interaction is detected between a first user device belonging to the first user and a second user device belonging to the second user. The detecting may include detecting that the first user device is proximate the second user device. The first user device may detects that it is proximate the second user device, or a server or a supervisor device may detect that the first user device is proximate the second user device based on location information received from the first user device and the second user device.

At 720, information related to the interaction is stored in a first interaction table associated with the first user device. The information may include one or more of a type of interaction, a location of the interaction, a time of the interaction, a duration of the interaction, a frequency of the interaction, an identifier of the first user device, an identifier of the first user, an identifier of the second user device, or an identifier of the second user. The interaction type may be one of a proximity detection, an SMS message, an MMS message, a phone call, or an email.

At 730, a relationship identifier is assigned to the second user based, at least in part, on the information related to the interaction. The assigning may include assigning the relationship identifier to the second user based on a plurality of interactions with one or more user devices belonging to the second user. Information about the plurality of interactions may be stored in the first interaction table. The plurality of interactions may include a plurality of interactions occurring within a threshold period of time, occurring at a particular time of day, occurring at a particular location, having a threshold duration, having a threshold frequency, and/or having a same interaction type. The particular location may be a home of the first user, a work place of the first user, a public location visited by the first user more frequently than a threshold, or a public location visited by the first user less frequently than a threshold. The relationship identifier may be one of Acquaintance, Coworker, Friend, Close Friend, or Family.

At 740, whether or not the assigned relationship identifier is correct is determined. The determining may include displaying the assigned relationship identifier to the first user and receiving input from the first user indicating whether or not the assigned relationship identifier is correct. If the flow of FIG. 7 is being performed by a server or a supervisor device, the server or supervisor device may instruct the first user device to perform the displaying and the receiving.

If the first user indicates that the assigned relationship identifier is not correct, the flow returns to 730 where a different relationship identifier may be assigned and presented to the first user. The different relationship identifier may be the next best guess. However, if the first user indicates that the assigned relationship identifier is correct, the relationship identifier is stored as, for example, an entry in the first interaction table for the second user.

The loop from 740 back to 730 may be performed a certain number of times, for example, two times, or until the first user indicates that the relationship identifier is correct. Alternatively, the first time the first user indicates that the relationship identifier is incorrect, the flow may return to 710 so that the first user device can continue to gather more information before attempting to assign a relationship identifier again.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for enabling context aware actions among heterogeneous Internet of Things (IoT) devices, comprising:
   receiving, at an IoT device, data representing a context of each of a first set of IoT devices in an IoT network;
   receiving, at the IoT device, data representing a current state of each of a second set of IoT devices in the IoT network; and
   determining, by the IoT device, an action to perform at a target IoT device based on the received data representing the context of each of the first set of IoT devices and the received data representing the current state of each of the second set of IoT devices.

2. The method of claim 1, wherein the data representing the context of each of the first set of IoT devices comprises data representing profiles of each of the first set of IoT devices, wherein a profile of an IoT device comprises schema elements and corresponding values of the IoT device.

3. The method of claim 2, wherein the schema elements comprise attributes describing the IoT device.

4. The method of claim 3, wherein the schema elements comprise one or more of an identifier, a make, a model, a time, a location, a status, an event, an association list, an association rank, or inter-dependencies associated with the IoT device.

5. The method of claim 1, wherein the data representing the current state of each of the second set of IoT devices comprises data representing schema elements of each of the second set of IoT devices.

6. The method of claim 5, wherein a current state of an IoT device comprises current values of one or more schema elements of the IoT device.

7. The method of claim 1, further comprising:
   determining an association rank of each IoT device in the first set of IoT devices,
   wherein the determining the action to perform comprises determining the action to perform at the target IoT device based on the received data representing the context of each of the first set of IoT devices, the received data representing the current state of each of the second set of IoT devices, and the determined association ranks.

8. The method of claim 1, wherein the IoT device comprises the target IoT device.

9. The method of claim 1, wherein the IoT device receives the data representing the context of each of the first set of IoT devices from the first set of IoT devices and the data representing the current state of each of the second set of IoT devices from the second set of IoT devices.

10. The method of claim 1, wherein the IoT device receives the data representing the context of each of the first set of IoT devices and the data representing the current state of each of the second set of IoT devices from a server for the IoT network.

11. The method of claim 1, wherein a server for the IoT network receives the data representing the context, the receiving data representing the current state, and the determining the action to perform.

12. The method of claim 1, wherein a second IoT device in the IoT network receives the data representing the context of each of the first set of IoT devices, receives the data representing the current state of each of the second set of IoT devices, and determines a different action to perform at the target IoT device based on the received data representing the context of each of the first set of IoT devices and the received data representing the current state of each of the second set of IoT devices.

13. An apparatus for enabling context aware actions among heterogeneous Internet of Things (IoT) devices, comprising:
   logic configured to receive, at an IoT device, data representing a context of each of a first set of IoT devices in an IoT network;
   logic configured to receive, at the IoT device, data representing a current state of each of a second set of IoT devices in the IoT network; and
   logic configured to determine, by the IoT device, an action to perform at a target IoT device based on the received data representing the context of each of the first set of IoT devices and the received data representing the current state of each of the second set of IoT devices.

14. The apparatus of claim 13, wherein the data representing the context of each of the first set of IoT devices comprises data representing profiles of each of the first set of IoT devices, wherein a profile of an IoT device comprises schema elements and corresponding values of the IoT device.

15. The apparatus of claim 14, wherein the schema elements comprise attributes describing the IoT device.

16. The apparatus of claim 15, wherein the schema elements comprise one or more of an identifier, a make, a model, a time, a location, a status, an event, an association list, an association rank, or inter-dependencies associated with the IoT device.

17. The apparatus of claim 13, wherein the data representing the current state of each of the second set of IoT devices comprises data representing schema elements of each of the second set of IoT devices.

18. The apparatus of claim 17, wherein a current state of an IoT device comprises current values of one or more schema elements of the IoT device.

19. The apparatus of claim 13, further comprising:
   logic configured to determine an association rank of each IoT device in the first set of IoT devices,
   wherein the logic configured to determine the action to perform comprises logic configured to determine the action to perform at the target IoT device based on the received data representing the context of each of the first set of IoT devices, the received data representing the current state of each of the second set of IoT devices, and the determined association ranks.

20. The apparatus of claim 13, wherein the IoT device comprises the target IoT device.

21. The apparatus of claim 13, wherein the IoT device receives the data representing the context of each of the first set of IoT devices from the first set of IoT devices and the data representing the current state of each of the second set of IoT devices from the second set of IoT devices.

22. The apparatus of claim 13, wherein the IoT device receives the data representing the context of each of the first set of IoT devices and the data representing the current state of each of the second set of IoT devices from a server for the IoT network.

23. The apparatus of claim 13, wherein the apparatus comprises a server for the IoT network.

24. The apparatus of claim 13, wherein the apparatus comprises a second IoT device in the IoT network.

25. An apparatus for enabling context aware actions among heterogeneous Internet of Things (IoT) devices, comprising:
   means for receiving, at an IoT device, data representing a context of each of a first set of IoT devices in an IoT network;
   means for receiving, at the IoT device, data representing a current state of each of a second set of IoT devices in the IoT network; and
   means for determining, by the IoT device, an action to perform at a target IoT device based on the received data representing the context of each of the first set of IoT devices and the received data representing the current state of each of the second set of IoT devices.

26. A non-transitory computer-readable medium for enabling context aware actions among heterogeneous Internet of Things (IoT) devices, comprising:
   at least one instruction to receive, at an IoT device, data representing a context of each of a first set of IoT devices in an IoT network;
   at least one instruction to receive, at the IoT device, data representing a current state of each of a second set of IoT devices in the IoT network; and
   at least one instruction to determine, by the IoT device, an action to perform at a target IoT device based on the received data representing the context of each of the first set of IoT devices and the received data representing the current state of each of the second set of IoT devices.

* * * * *